US006784359B2

(12) United States Patent
Clark et al.

(10) Patent No.: US 6,784,359 B2
(45) Date of Patent: Aug. 31, 2004

(54) APPARATUS AND METHOD FOR THE DESIGN AND MANUFACTURE OF FOLDABLE INTEGRATED DEVICE ARRAY STIFFENERS

(75) Inventors: Cary R. Clark, Littleton, CO (US); Jeff Summers, Littleton, CO (US); Jason Wood, Highlands Ranch, CO (US); Bill Zuckermandel, Highlands Ranch, CO (US)

(73) Assignee: Microsat Systems, Inc., Littleton, CO (US)

( * ) Notice: Subject to any disclaimer, the term of this patent is extended or adjusted under 35 U.S.C. 154(b) by 0 days.

(21) Appl. No.: 10/086,373

(22) Filed: Mar. 4, 2002

(65) Prior Publication Data

US 2003/0164186 A1 Sep. 4, 2003

(51) Int. Cl.[7] .......................... H01L 31/045; B64G 1/44
(52) U.S. Cl. ....................... 136/245; 136/292; 244/173; 52/173.3; 403/102; 438/66; 438/80; 429/2; 429/149
(58) Field of Search ................................ 136/245, 292; 244/173; 52/173.3; 403/102; 438/66, 80; 429/2, 149

(56) References Cited

U.S. PATENT DOCUMENTS

| 3,690,080 A | * | 9/1972 | Dillard ........................ 52/108 |
| 4,155,524 A | * | 5/1979 | Marello et al. ............. 244/173 |
| 5,785,280 A | * | 7/1998 | Baghdasarian .............. 244/173 |
| 6,031,178 A | * | 2/2000 | Kester ........................ 136/245 |
| 6,175,989 B1 | * | 1/2001 | Carpenter et al. ............ 16/225 |
| 6,284,966 B1 | * | 9/2001 | Simburger et al. .......... 136/244 |
| 6,437,232 B1 | * | 8/2002 | Dailey et al. ............... 136/245 |

FOREIGN PATENT DOCUMENTS

| EP | 884241 A1 | * | 12/1998 |
| WO | WO-00/10207 A1 | * | 2/2000 |

OTHER PUBLICATIONS

Fairbanks et al, "Adaptation of Thin–Film Photovoltaic Technology for Use in Space," 26th PVSC, Sep. 30 to Oct. 3, 1997, pp. 979–982.*

* cited by examiner

Primary Examiner—Alan Diamond
(74) Attorney, Agent, or Firm—Lathrop & Gage L.C.

(57) ABSTRACT

The present invention relates to an apparatus and method for the design and manufacture of foldable integrated stiffeners. These stiffeners may be used in, for example, thin-film arrays of electrochemical devices.

69 Claims, 12 Drawing Sheets

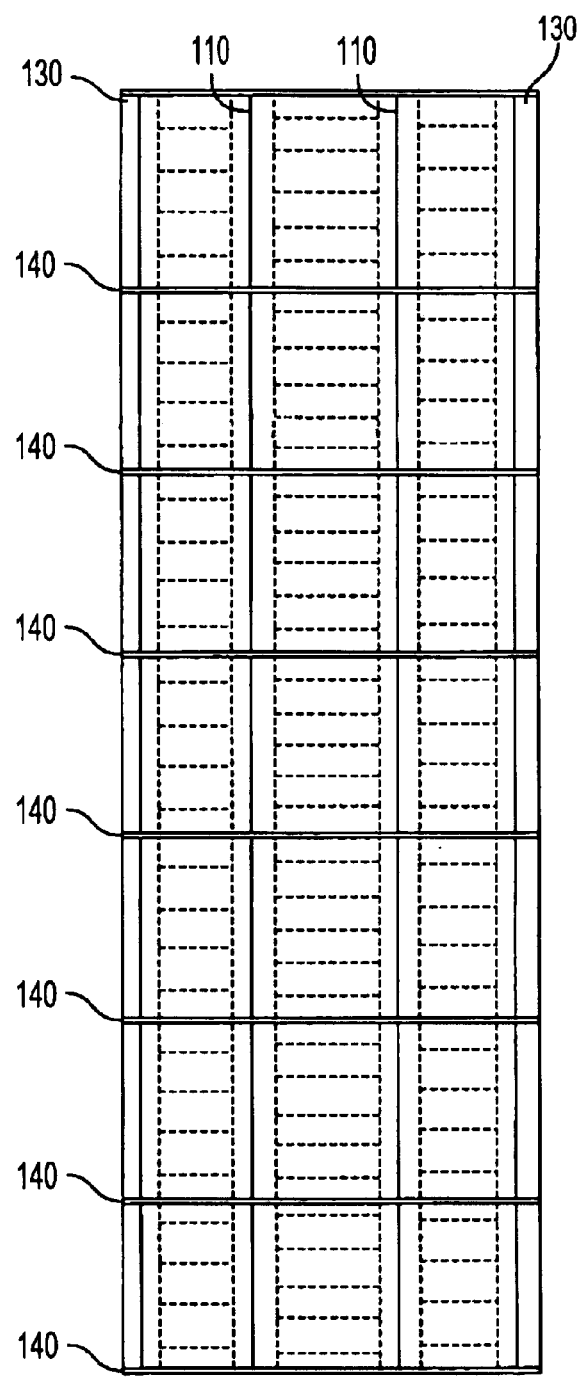
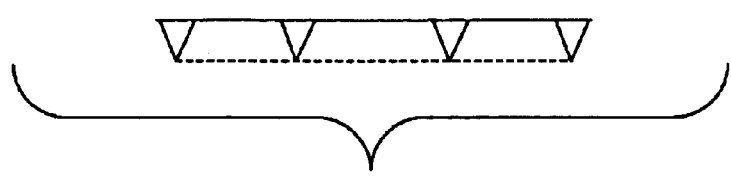
FIG. 6

APPARATUS AND METHOD FOR THE DESIGN AND MANUFACTURE OF FOLDABLE INTEGRATED DEVICE ARRAY STIFFENERS

FIELD OF THE INVENTION

The present invention relates to an apparatus and method for the design and manufacture of foldable integrated stiffeners. These stiffeners may be used in, for example, thin-film arrays of electrochemical devices.

BACKGROUND OF THE INVENTION

Presently, a need exists for solar arrays that exhibit low weight per unit energy produced, as well as low cost per unit energy produced. Conventional approaches to solar array systems employ complex mechanisms to deploy solar arrays from a folded or collapsed initial state. These mechanisms require the addition of structure to meet the requirements of the array. These structures include, for example, booms. Requirements for these arrays include launch restraint protection, stiffening to meet minimum array natural frequency, deployment mechanisms, and robust structural protection. Conventional technology can only meet these requirements, if at all, through costly and complex mechanisms that require additional structures that add to the cost and weight of the array. Minimum costs using conventional technology are about $1000/Watt. Maximum beginning of life specific power using conventional technology is about 106 Watts/kg.

SUMMARY OF THE INVENTION

This invention responds to the problems described above by teaching, for example, novel foldable integrated stiffeners. These stiffeners may be used in, for example, thin-film arrays of electrochemical devices, or in other arrays of devices including foldable arrays of rigid electrochemical devices. In certain embodiments, for example, the cost may be less than $200/Watt and the specific power may be greater than 300 Watt/kg.

An embodiment of the present invention relates to, for example stiffeners, foldable stiffeners, or supporting structures for foldable thin-film arrays of, for example, electrochemical devices. In this embodiment, these structures may include a pair of hingedly attached members that connect to a pair of the electrochemical devices. These members may be collapsible or extensible by folding due to their hinged attachment. Additionally, a third member may supply additional structural support. This member may, for example, be rib-like. It may connect both to one of the electrochemical devices as well as to one of the pair of hinged members connected to that device. A portion of this device may be adapted to permit it to be folded with the pair of hinged members. The means for folding may, for example, include a living hinge. Additionally, it may be advantageous to provide an edge stiffener along the periphery of one or more of the electrochemical devices. This edge stiffener may provide the benefit of aiding in passive deployment as well as the benefit of providing structural strength.

Another embodiment of the present invention relates to techniques for integrated passive deployment, such as "living-hinge" deployment. In this embodiment, the previously described structures may be incorporated into a deployable assembly of electrochemical devices. Preferably, a plurality of these structures may be used to reinforce the assembly, and may, in certain instances, aid in the passive deployment of the assembly.

A further embodiment of the present invention relates to techniques for integrating power cabling and structural support or stiffening. In this embodiment, the previously described structures are combined with integrated power cabling.

It is an object of the present invention to provide a low cost and high specific power solar array for use in, for example, space applications.

It is a further object of the present invention to provide a passive, integrated, foldable, lightweight, deployable spacecraft structure for use with, for example, thin-film photovoltaic arrays.

It is a further object of the present invention to extend the bounds of existing space photovoltaic systems by, for example, combining flexible thin-film photovoltaics with integrated power cabling and stiffening.

It is a further object of the present invention to simplify design techniques by, for example, providing a scalable method for creating deployable space solar arrays.

It is a further object of the present invention to provide an array stiffening method that is adaptable to increasingly efficient photovoltaic design techniques including, for example, developments in multi-junction and polyimide substrate thin-film photovoltaics.

It is a further object of the present invention to provide an array stiffening structure that meets a minimum array natural frequency.

It is a further object of the present invention to provide an array of space photovoltaic cells capable of being supplied with launch restraint protection hardware.

It is a further object of the present invention to provide an array of space photovoltaic cells that may be reliably deployed.

It is a further object of the present invention to provide robust structural protection to an array of space photovoltaic cells.

It is a further object of the present invention to provide a low mass, low cost, and low complexity space solar array by, for example, providing a method for flexible thin-film materials to meet spacecraft requirements.

It is a further object of the present invention to meet spacecraft requirements without bulky, massive, complex, or expensive additional structure.

It is a further object of the present invention to provide an innovative method of stowing, deploying, and stiffening a lightweight, flexible solar array, while minimizing mass.

It is understood that both the foregoing general description and the following detailed description are exemplary and explanatory only and are not restrictive of the invention as claimed. The invention is described in terms of arrays of electrochemical devices; however, one skilled in the art will recognize other uses for the invention, such as, arrays of, for example, bioelectric devices. The accompanying drawings illustrating an embodiment of the invention together with the description serve to explain the principles of the invention.

BRIEF DESCRIPTION OF THE DRAWINGS

FIG. 6 is a diagram of an embodiment of the present invention employing a plurality of thin-film stiffeners.

DETAILED DESCRIPTION OF THE INVENTION

Figure 1:
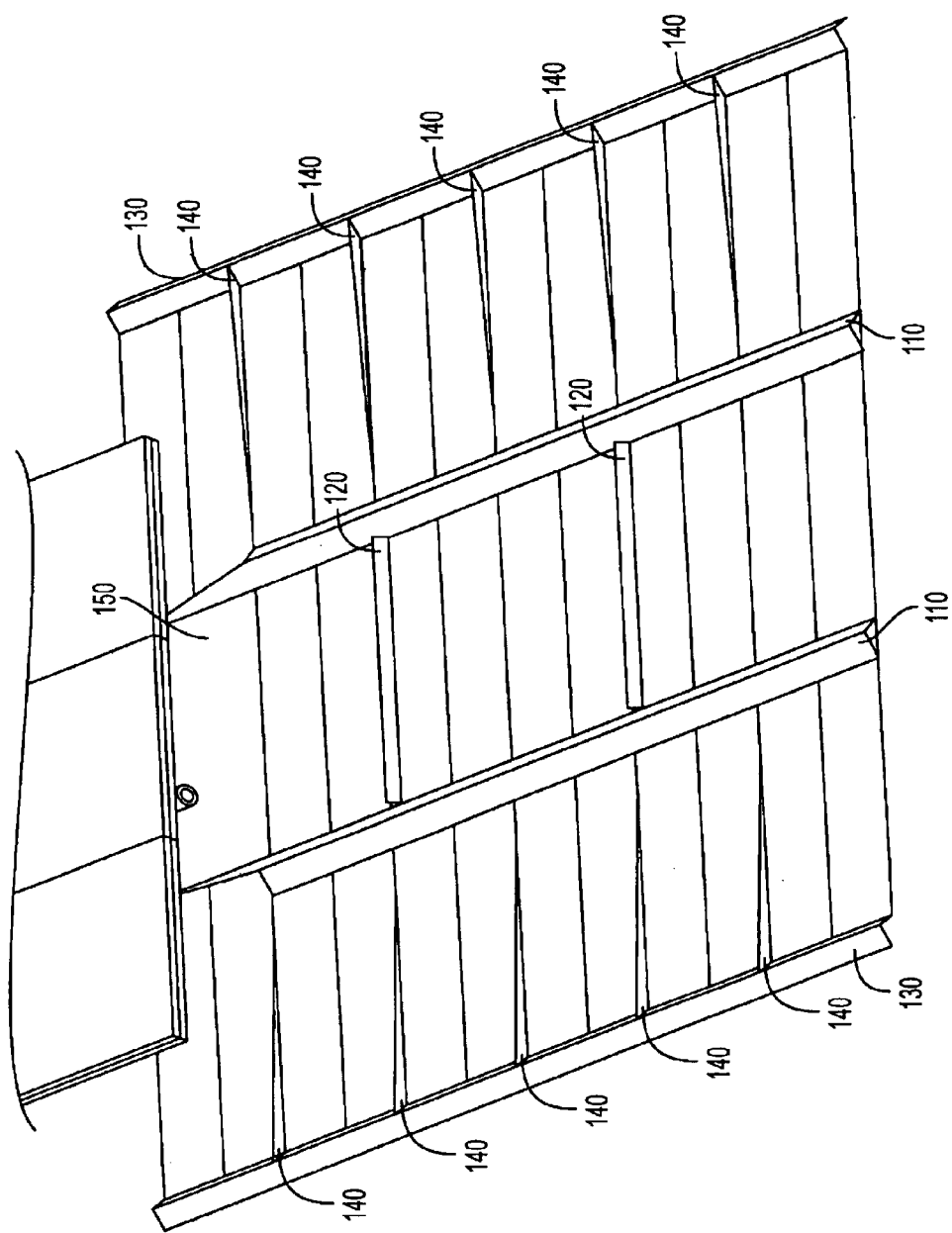
FIG. 1 is a perspective depiction of an embodiment of the present invention employing a plurality of bracing members.

It is to be understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an array" is a reference to one or more arrays and includes equivalents thereof known to those skilled in the art. Similarly, for another example, a reference to "a step" or "means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise.

Structures described herein are to be understood also to refer to functional equivalents of such structures. Language that may be construed to express approximation should be so understood unless the context clearly dictates otherwise. When a process or method is described herein, in terms of steps, no significance should be given to the order in which the steps are described unless the context clearly indicates otherwise. As used herein, the term electrochemical devices includes conventional electrochemical devices as well as inactive substrates and devices equivalent to traditional electrochemical devices such as direct conversion antennas radio-frequency identification tags, and other energy conversion devices. The invention is described, in certain instances, in terms of thin-film arrays of electrochemical devices; however, one of ordinary skill in the art will recognize other applications for this invention including, for example, applications with other arrays of electrochemical devices.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The term "end of life" has special meaning in the art and in general, means the time at which a device's intended operation is complete. For example, the end of life of a solar array for use in an orbital system may correspond to the time at which the orbital system is expected to be no longer functional. All references cited herein are incorporated by reference herein in their entirety.

One example of the present invention is an embodiment in which stiffeners or supporting structures are provided for foldable arrays of electrochemical devices. These arrays of devices may, for example, include thin-film arrays or arrays of other types of devices such as bioelectric devices. In this example, these structures may include a pair of hingedly attached bracing members that connect to a pair of electrochemical devices. The electrochemical devices may also be connected to one another in a hinged manner. The electrochemical devices may have at least a first side, and a second side opposite the first side. In one example of the present embodiment, the pair of bracing members may be attached by attaching one bracing member to each of the first sides of the pair of electrochemical devices. In this embodiment, the electrochemical devices may be approximately adjacent and may essentially share an edge, i.e. the devices may be approximately aligned with one another even though their corresponding edges may have the different shapes, or may be separated by an intervening structure such as a portion of a shared substrate. A portion of this edge may provide a connection by means, for example, of a carpenter hinge or any mechanical equivalent along at least a portion of the essentially shared edge. Other means of hingedly attaching the electrochemical devices are not excluded.

In this embodiment, the electrochemical devices may be initially co-planar with their first faces directed in approximately the same direction. This position may be described as the "open position." The position in which the electrochemical devices are in substantially parallel planes with their first faces facing each other may be described as the "inwardly folded" position. The position in which the electrochemical devices are in substantially parallel planes with their second faces facing each other may be described as the "outwardly folded" position. Although the two devices may be "folded" in conventional terminology, in that the two electrochemical devices may reside on a single substrate; nevertheless, as used herein, the term folded refers to the repositioning of a pair of members or sub-members without regard to whether the members or sub-members consist of a single piece. In this embodiment, "above" refers to the direction normal to the first face of the electrochemical devices in the open position. Additionally, as used herein the verb "fold" may refer to a process that brings two sides together or that separates two sides. Thus, by this definition, the use of the term "unfold" herein is obviated. Although the pairs of bracing members described herein are designed to be collapsed by folding, when folded, the bracing members may be further collapsed by rolling. Thus, for example, a pair of bracing members may be folded in a first direction and subsequently, together with the attached devices, rolled in a, for example, perpendicular direction.

In this embodiment, the pair of bracing members may connect at a point that approximately lies above the essentially shared edge. These members may be collapsible or extensible by folding because of their hinged attachment with each other and with the electrochemical devices. Additionally, a third member may supply additional structural support. This third member may be rib-like, and may connect to one of the electrochemical devices as well as to one of the pair of hinged members connected to that device. A portion of this device may be adapted to permit folding with the pair of hinged members as the pair of electrochemical devices fold inwardly.

Additionally, it may be advantageous to provide an edge stiffener along the periphery of one or more of the electrochemical devices. This edge stiffener may provide the benefits of aiding in passive deployment and providing structural strength. The edge stiffener may, for example, be a long, narrow, piece of metal, provided with a slight arc-shaped curvature in one or more direction. Thus, for example, the edge stiffener may be shaped similar to the tape found in a conventional tape measure. The material from which the edge stiffener may be formed may, for example, be a metal or metal alloy or other flexible material that is capable of at least partially restoring its original shape. The edge stiffener may also be used as a hinge. A hinge of this type may be described as a carpenter hinge or tape hinge. Other types of hinges may include foldable polyimide joints, other foldable joints, and conventional hinges, including, for example, hinges that incorporate integral torsion springs. Hybrid hinges involving a combination of two or more of the foregoing hinges are also permitted. The edge stiffener may be used as a living hinge to provide deployment force to the array.

An array of electrochemical devices connected and provided with hinged means for bracing as described herein, may be deployed from an initial collapsed position to an open position. This process may be produced, for example, by a passive deployment technique. This technique may include providing edge stiffeners that have a propensity to align themselves in a largely straight position, connected to or interwoven with the array. In the initial collapsed position, the array may be stowed, for example, in a container that prevents the edge stiffeners from straightening. This container may include launch resistant protection hardware if the array is to be deployed, for example, in space. The container may additionally, for example, contain a means for releasing the array. This may include a releasable hinged panel. Although the array may be released, in that it is no longer constrained within the container, it may be advantageous for the array to remain connected, for example, by one end or side to the container.

In one embodiment, once the array is released from the container, it begins to fold towards in open position in a first a direction. Subsequently, it may also fold towards an open position in other directions. For example, the array may be arranged so that it includes a central section and two "wing" sections on each side. These wing sections may, for example, have approximately equal area to the central section. The array may be adapted so that the wing sections collapse in an outwardly folded position with the central section. The central section together with the collapsed wing sections may be adapted to further collapse in an alternating inwardly folded and outwardly folded position, similar to the folds of an accordion.

This pattern for folding an array of electrochemical devices is just one way of folding such an array. One of skill in the art will recognize that other folding patterns may be used. If an edge stiffener or functionally equivalent device (such as, for example, a conventional hinge with an integrated torsion spring) is used, the array may be described as self-deployed. Other terms relating to self-deployment include "passive deployment," which connotes that no external force is required for deployment, and "living hinge deployment," which connotes that the array has hinges or hinge-like folds that open or close without the requirement of application of external force. In contrast, certain embodiments of the present invention may also be provided with an external means of force, or may be deployed by alternative internal means of force, such as, for example, inflation of chambers adapted to receive a fluid.

In certain embodiment of the present invention, it may advantageous to integrate electrical cabling on or as the stiffeners. This electrical cabling may include flexible circuit technology, such as etched copper circuits on a flexible insulating substrate. The electrical cabling may be adapted to serve as power or signal cabling. In certain applications, other circuitry may be added on the stiffeners including, but not limited to, filtering, boosting, amplifying, or automatic bypassing circuits.

In embodiments of the present invention for applications in space or similar environments, it may be advantageous to provide an electrostatic discharge layer coating at least a substantial portion or all of the stiffeners and array.

FIG. 1 is a perspective depiction of an embodiment of the present invention employing a plurality of bracing members. This embodiment includes an array of 36 electrochemical devices on a single substrate. The substrate may be, as in this example, adapted to be folded and stowed in the storage compartment. Six pairs (110, 120, 130) of bracing members are depicted in this embodiment. Additionally, this embodiment employs edge stiffeners along the periphery of the array. The six pairs (110, 120, 130) of the bracing members may be placed in three categories. The first category may be referred to as "outside fold" pairs 110. These pairs 110 of members are provided across folds in the substrate that are adapted to allow adjacent electrochemical devices to be placed in an outwardly folded position. The second category may be referred to as "inside fold without rib" pairs 120. These pairs 120 of members are provided across folds in the substrate that are adapted to allow adjacent electrochemical devices to be placed in an inwardly folded position. Additionally, members in this category, are not connected with a rib-like bracing member. Finally, the last two pairs 130 of bracing members, in this embodiment, may be described as "inside fold with rib" pairs 130. These pairs 130 are similar to the inside fold without rib pairs 120, with the addition of one or more rib-like members attached between them and an electrochemical device. In this embodiment, for example, each inside fold with rib pair is accompanied by five rib-like members 140. These rib-like members 140 are, in this embodiment, situated in the area of the substrate that provides a fold between a pair of electrochemical devices.

In other embodiments, the rib-like members 140 may attach directly to an electrochemical device. This alternate embodiment may have the advantage of permitting a continuous electrochemical device in contrast to a plurality of connected electrochemical devices. The bracing members 110, 120, 130, 140 may be manufactured from the same material as the substrate, and may, if desired, include electrochemical devices, integrated circuits, or power or signal cabling. In this embodiment, the inside fold with rib pairs 130 are connected between several traditional electrochemical devices and a narrow piece of inactive substrate. One or more of the electrochemical devices may be connected to restraint and release (R&R) hardware. In this embodiment, a pair of electrochemical devices are attached to the R&R hardware 150.

Figure 2:
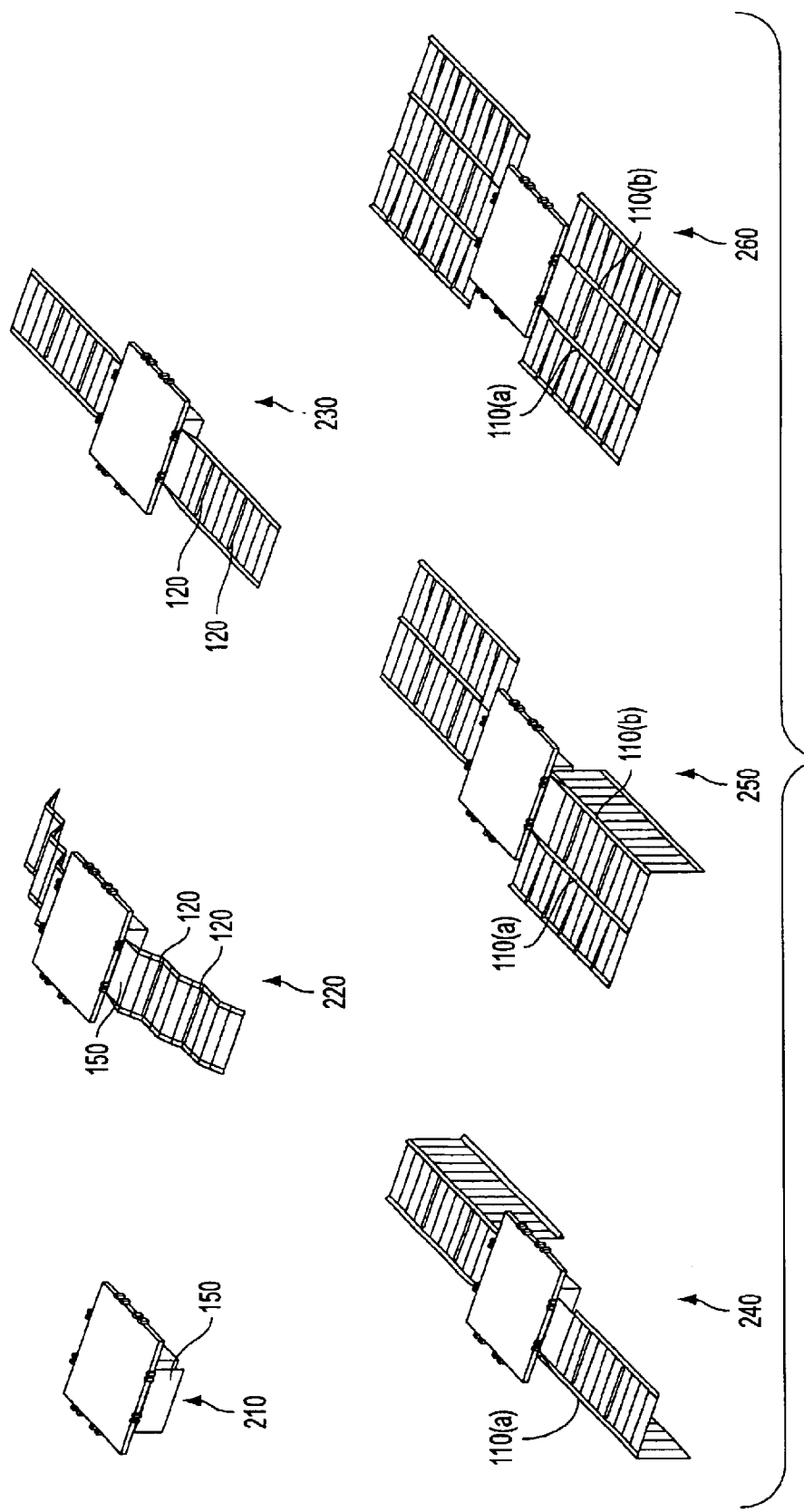
FIG. 2 depicts a chronological sequence demonstrating the self-deployment of an embodiment of the present invention.

FIG. 2 depicts a chronological sequence demonstrating the self-deployment of an embodiment of the present invention. In frame 210, an array of electrochemical devices is depicted enclosed in storage and/or R&R hardware 150. In frame 220, the array of electrochemical devices is depicted in a partially deployed position. In this position, the areas that corresponded to positions for inside fold without rib pairs 120 are partially folded. In frame 230, the array of electrochemical devices is depicted in a partially deployed position. In this position, the areas that corresponded to positions for inside fold without rib pairs 120 have been completely folded into an open position. In frame 240, the array of electrochemical devices is depicted in a partially deployed position. In this position, the area that corresponds to a position for one of the outside fold pairs 110(a) is partially folded. In frame 250, the array of electrochemical devices is depicted in a partially deployed position. In this position, the area that corresponded to a position for one outside fold pair 110(a) is completely folded into an open position, and the area that corresponded to a second outside fold pair 110(b) is partially folded. In frame 260, the array of electrochemical devices is shown in a completely deployed position. All bracing members and electrochemical devices have been folded into open positions.

Figure 3:
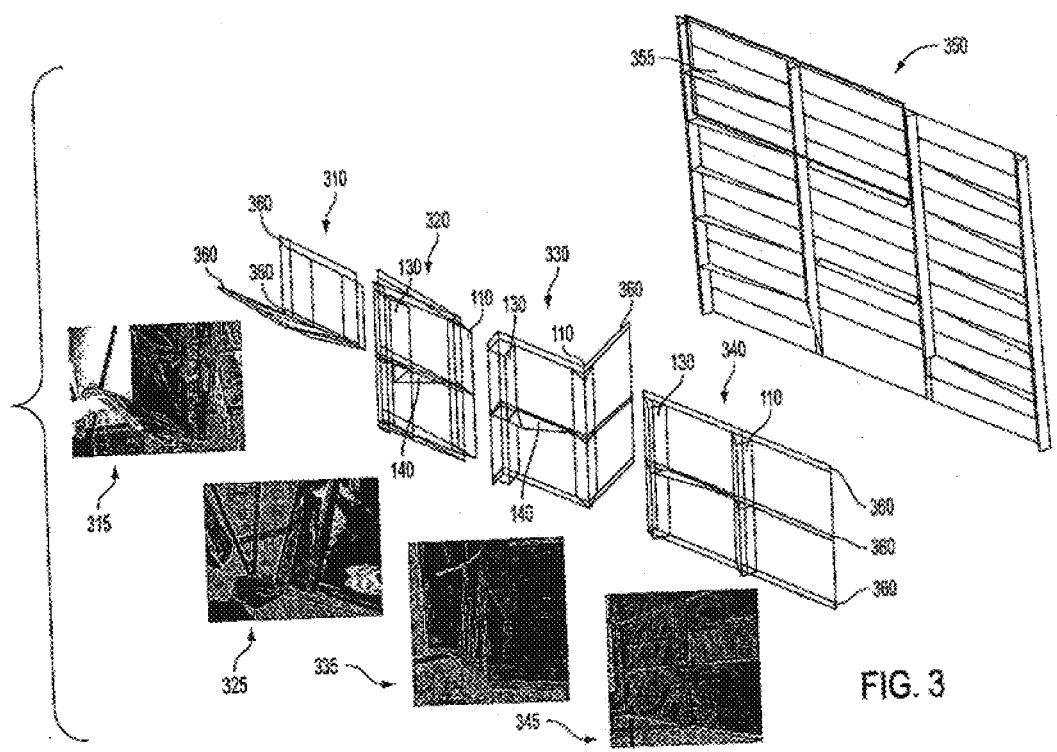
FIG. 3 provides a chronological sequence demonstrating self-deployment together with corresponding photographs of a model of an embodiment of the present invention.

FIG. 3 provides a chronological sequence demonstrating self-deployment together with corresponding photographs of a model of an embodiment of the present invention. In Frames 310, 320, 330, and 340, edge stiffeners 360 are portrayed in light gray along the top and bottom edges as well through the center of the model. Frame 310 depicts a partially folded segment 355 of the array shown in frame 350. A photograph of an example embodiment in this position is shown in frame 315. Frame 320 is a look-through diagram of a partially folded embodiment of the present invention. A photograph of an example embodiment in this position is shown in frame 325. In frames 320 and 325 the bracing members 110, 130, 140 are folded in a collapsed position. No inside fold without rib pairs of bracing members are included in this example embodiment. Frame 330 is a look-through diagram of a partially folded embodiment of the present invention. A photograph of an example embodiment in this position is shown in frame 335. In these frames (330, 335), the bracing members 110, 130, 140 are shown in a partially collapsed, partially extended position. Frame 340 is a look-through diagram of a completely folded embodiment of the present invention in an open position. A photograph of an example embodiment in this position is shown in frame 345. In frames 340 and 345 the bracing members 110, 130, 140 are shown in a completely extended position. Frame 350 depicts an array of which the previous frames depicted a portion, in fully folded open position.

Figure 4:
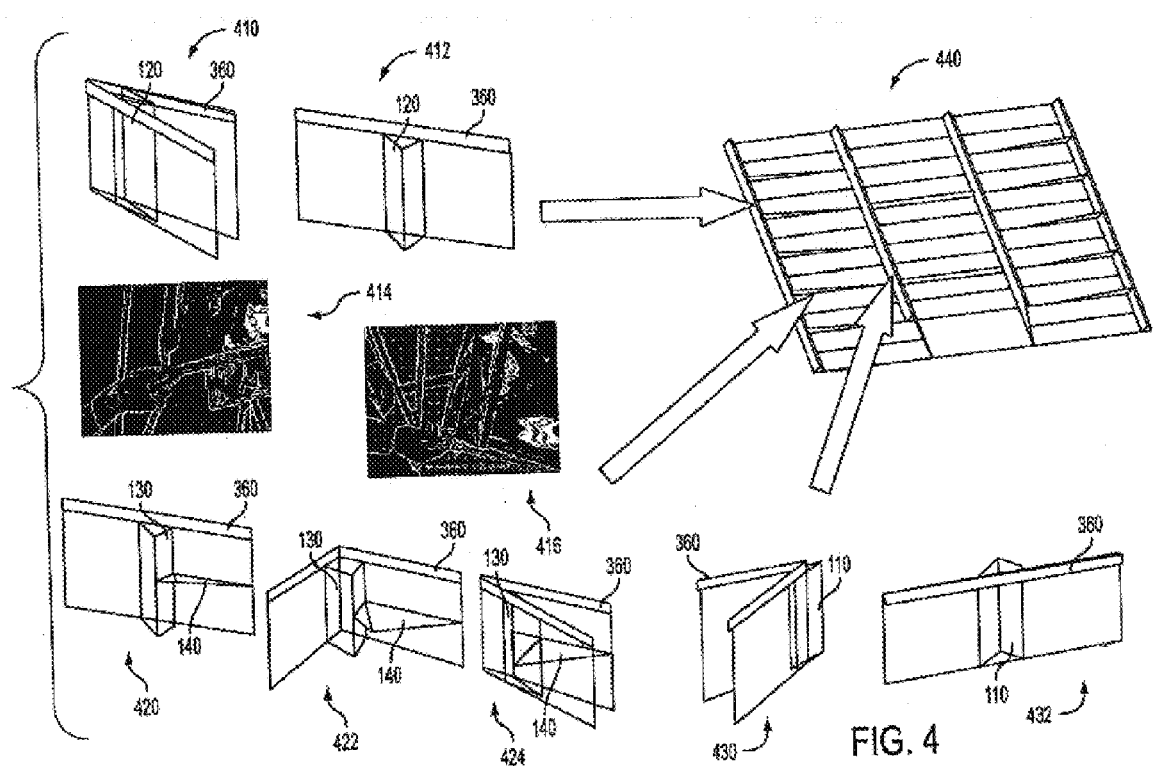
FIG. 4 depicts several embodiments of the present invention employed together in an array of electrochemical devices.

FIG. 4 depicts several embodiments of the present invention employed together in an array of electrochemical devices. Frames 410 and 412 depict a substantially collapsed and an extended example, respectively, of an inside fold without rib pair 120 of bracing members. Frame 414 is a photograph of an example embodiment of the present invention in approximately the position shown in frame 410. Frame 416 is a photograph of an example embodiment of the present invention in approximately the position shown in frame 412. Frames 420, 422, and 424 depict an example of an inside fold with rib pair 130 of bracing members in an extended open position, partially folded position, and substantially collapsed position, respectively. Frames 430 and 432 depict an example of an outside fold pair 110 of bracing members in a substantially collapsed and extended position respectively. Frame 440 depicts an embodiment of the current invention integrating a combination of inward fold without brace pairs, inward fold with brace pairs, and outward fold pairs. In this figure, the top arrow points out a place in the embodiment depicted in frame 440 at which an embodiment exemplified in frames 410, 412, 414, and 416 may be situated. The middle arrow points out a place in the embodiment depicted in frame 440 at which an embodiment exemplified in frames 420, 422, and 424 may be situated. The bottom arrow points out a place in the embodiment depicted in frame 440 at which an embodiment exemplified in frames 430 and 432 may be situated.

Figure 5:
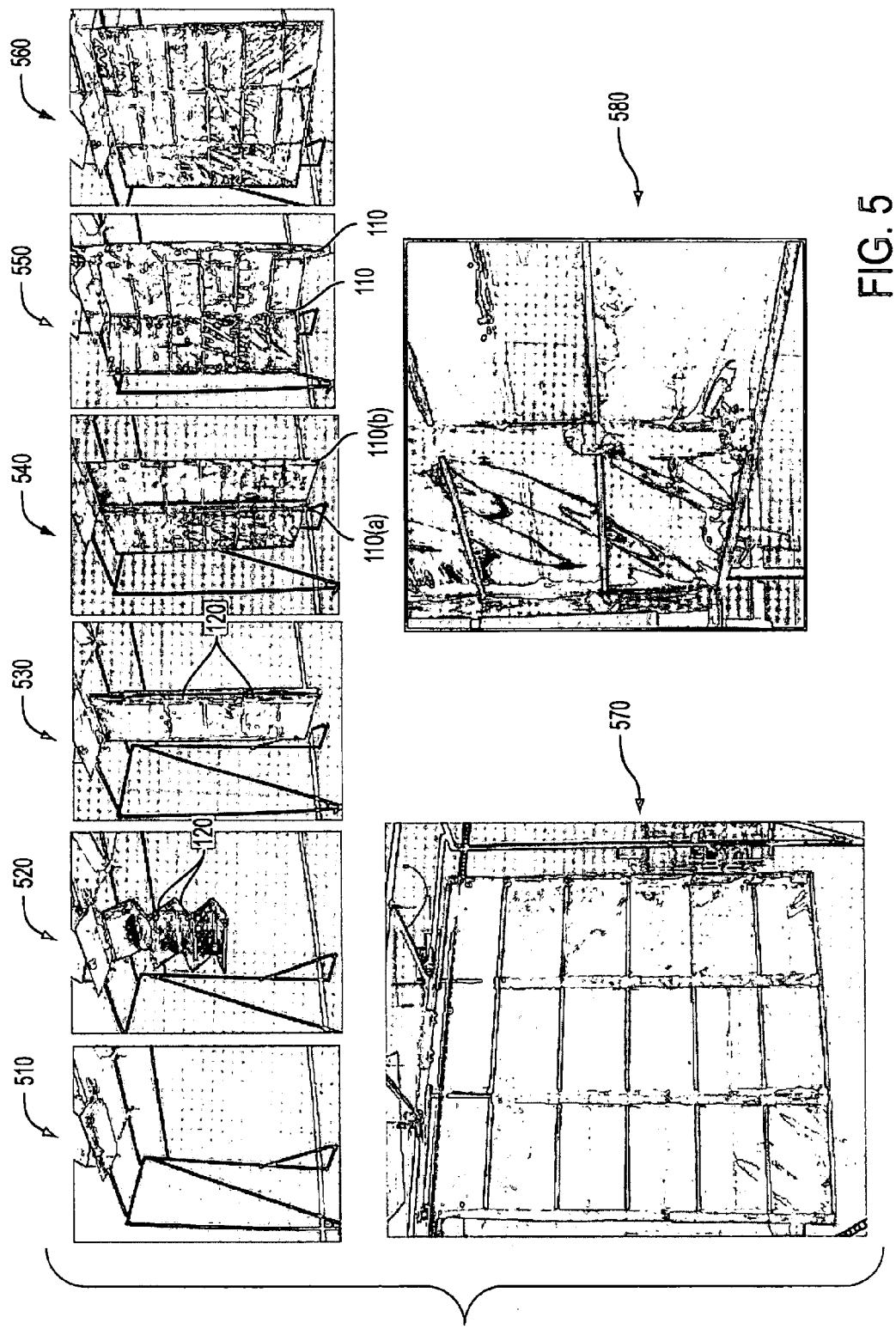
FIG. 5 depicts a chronological sequence of photographs demonstrating the self-deployment of an embodiment of the present invention, together with a close-up photograph of a portion of a fully deployed embodiment of the present invention.

FIG. 5 depicts a chronological sequence demonstrating the self-deployment of an embodiment of the present invention, together with a close-up photograph of a portion of a fully deployed embodiment of the present invention. In frame 510, an array of electrochemical devices is depicted enclosed in storage and/or R&R hardware 150. In frame 520, the array of electrochemical devices is depicted in a partially deployed position. In this position, the areas that corresponded to positions for inside fold without rib pairs 120 are partially folded. In frame 530, the array of electrochemical devices is depicted in a partially deployed position. In this position, the areas that corresponded to positions for inside fold without rib pairs 120 have been completely folded into an open position. In frame 540, the array of electrochemical devices is depicted in a partially deployed position. In this position, the area that corresponded to a position for one outside fold pair 110(a) is completely folded into an open position, and the area that corresponded to a second outside fold pair 110(b) is completely folded in a collapsed position. In frame 550, the array of electrochemical devices is depicted in a partially deployed position. In this position, the areas that corresponded to a position for both outside fold pairs 110 are partially folded. In frames 560 and 570, the array of electrochemical devices is shown in a completely deployed (extended) position. All bracing members and electrochemical devices have been folded into open positions. Frame 580 provides a closer look at a portion of the bottom edge of the array of electrochemical devices as shown in frames 560 and 570.

FIG. 6 is a diagram of an embodiment of the present invention employing a plurality of thin-film stiffeners. This figure depicts an embodiment adapted to produce approximately 6000 Watts at its end of life. In this embodiment, the edge stiffeners 140 and hinges (which may be provided by the edge stiffeners 140) are provided in a grid-like arrangement among blocks of electrochemical devices. In this example, four pairs 110, 130 of hinged bracing members may be provided along the length of the array. Two of these pairs may be outside folded pairs 110 and two may be inside fold with rib pairs 130. The direction in which the hinged pairs 110, 130 of bracing members run may be considered the vertical direction in this example. The ribs 140 may run in the horizontal direction. In this example, the ribs 140 may be aligned to correspond to the horizontal folds in the array. The horizontal fold areas may also each include a tape stiffener and/or a carpenter hinge (which may be provided by an edge stiffener 140). The length of this array in the vertical dimension is about 609 inches. The width in the horizontal dimension is about 120 inches. The pairs 110, 130 of bracing members when in the open position approximate the shape of a triangle. The height of the triangle formed in this instance may be about 20 inches, and the base of the triangle may be about 12 inches. In this example, the two outside folded pairs 110 of hinged bracing members divide the array into three segments: a central segment and two wing segments. The central segment in this example is about 60 inches wide, and each wing segment is approximately 30 inches wide. Thus, when the two wing segments are collapsed onto the central segment, they may not overlap. After the wing segments are collapsed into the central segment, the array may be further collapsed by rolling, folding, or a combination thereof. Additionally, conventional film stiffeners, depicted as a dashed grid in the figure, may be provided to augment the stiffening function.

Figure 7:
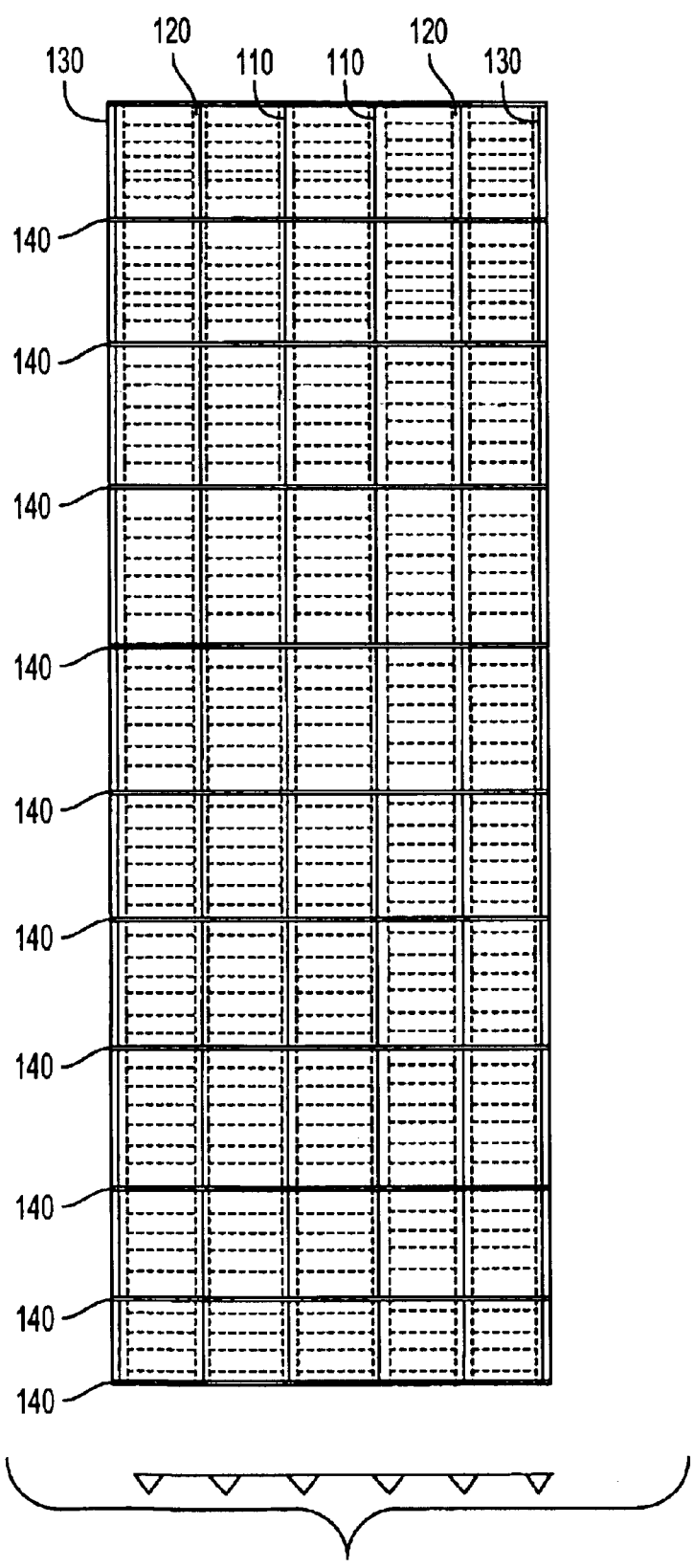
FIG. 7 is a diagram of another embodiment of the present invention employing a plurality of thin-film stiffeners.

FIG. 7 is a diagram of another embodiment of the present invention employing a plurality of thin-film stiffeners. This figure depicts an embodiment adapted to produce approximately 15000 Watts at its end of life. In this embodiment, the edge stiffeners 140 and hinges (which may be provided by the edge stiffeners 140) are provided in a grid-like arrangement among blocks of electrochemical devices. In this example, six pairs 110, 120, 130 of hinged bracing members may be provided along the length of the array. Two of these pairs may be outside folded pairs 110, two may be inside fold without rib pairs 120, and two may be inside fold with rib pairs 130. The direction in which the hinged pairs 110, 120, 130 of bracing members run may be considered the vertical direction in this example. The ribs 140 may run in the horizontal direction. In this example, the ribs 140 may be aligned to correspond to the horizontal folds in the array. The horizontal fold areas may also each include a tape stiffener and/or a carpenter hinge (which may be provided by an edge stiffener 140). The length of this array in the vertical dimension is about 1015 inches. The width in the horizontal dimension is about 180 inches. The pairs 110, 120, 130 of bracing members when in the open position approximate the shape of a triangle. The height of the triangle formed in this instance may vary among the pairs 110, 120, 130 of bracing members. In this instance the two most central pairs 110 of bracing members may have a height of about 54 inches, and the other pairs 120, 130 of bracing members may have a height of about 24 inches. The base of the triangle may, in each instance, be about 12 inches. In this example, the two outside folded pairs 110 and two inside folded without rib pairs 120 may divide the array into five segments, each segment 36 inches wide. Thus, when each segment collapses toward its neighbor it will approximately completely overlap. Additionally, conventional film stiffeners, depicted as a dashed grid in the figure, may be provided to augment the stiffening function.

Figure 8:
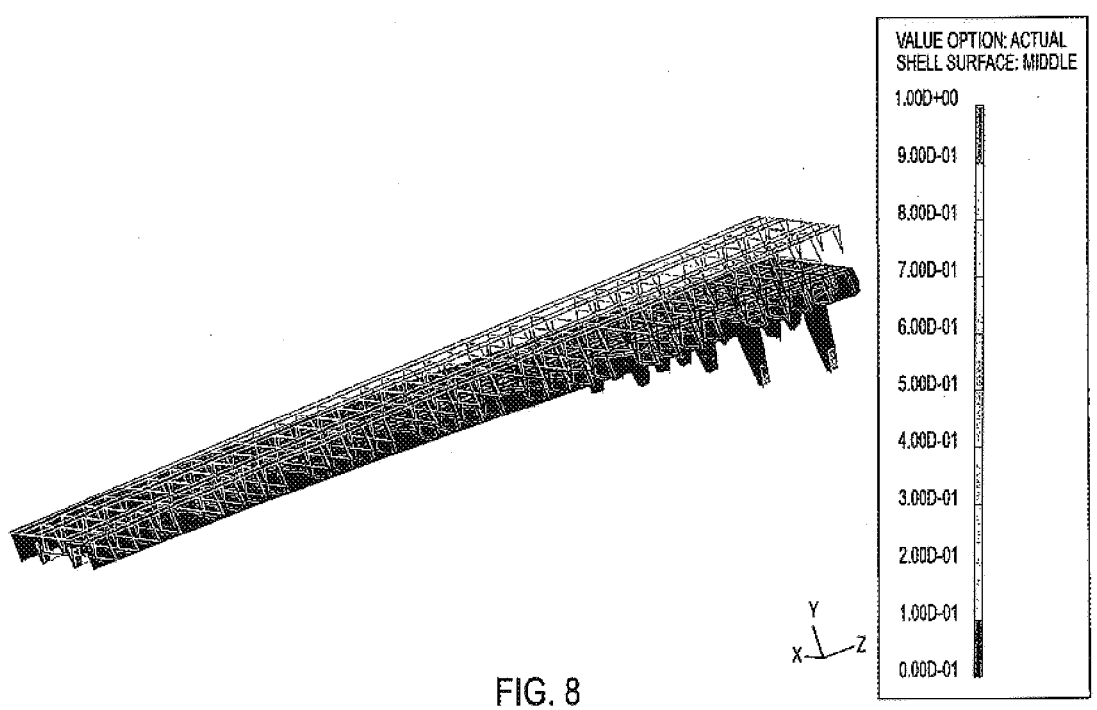
FIG. 8 is a computer rendered depiction of the results of simulation testing of an embodiment of the present invention.

FIG. 8 is a computer rendered depiction of the results of simulation testing of an embodiment of the present invention. To create this depiction, a simulated embodiment of the present invention was subjected to flexible body analysis. The embodiment was a model of an embodiment designed to produce 6000 Watts at the end of its life. The output of this analysis is shown. The depiction shows maximum deflection and modes at the natural frequency of the array. These results indicate that this embodiment of the present invention meets the structural requirements imposed in a space deployment environment.

Figure 9:
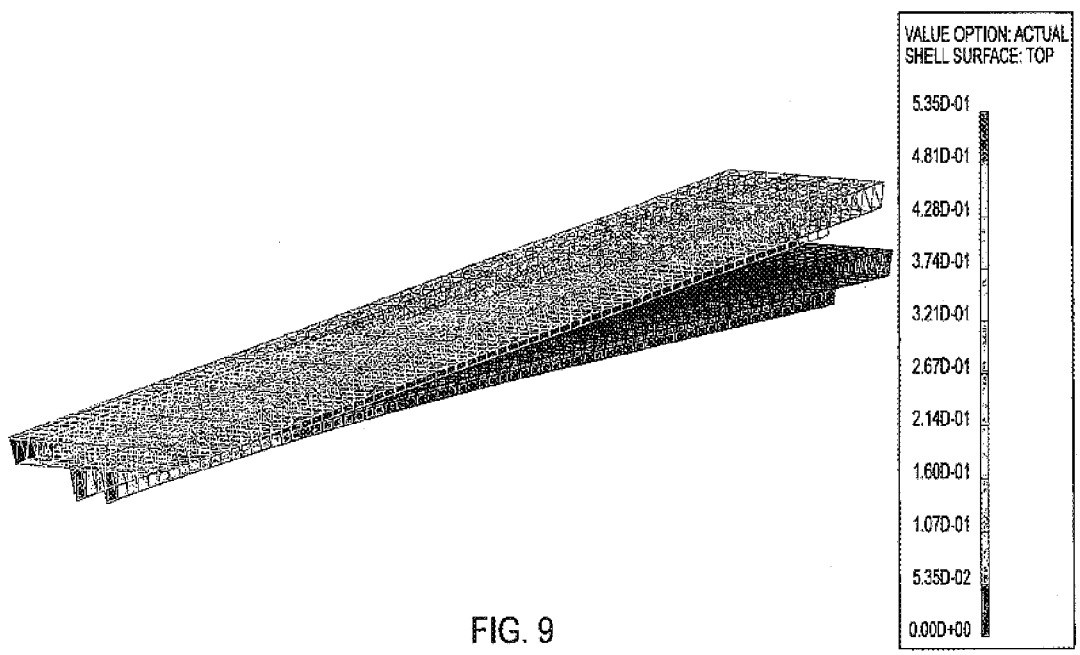
FIG. 9 is a computer rendered depiction of the results of simulation testing of another embodiment of the present invention.

FIG. 9 is a computer rendered depiction of the results of simulation testing of another embodiment of the present invention. To create this depiction, a simulated embodiment of the present invention was subjected to flexible body analysis. The embodiment was a model of an embodiment designed to produce 15000 Watts at the end of its life. The output of this analysis is shown. The depiction shows maximum deflection and modes at the natural frequency of the array. These results indicate that this embodiment of the present invention meets the structural requirements imposed in a space deployment environment.

Figure 10:
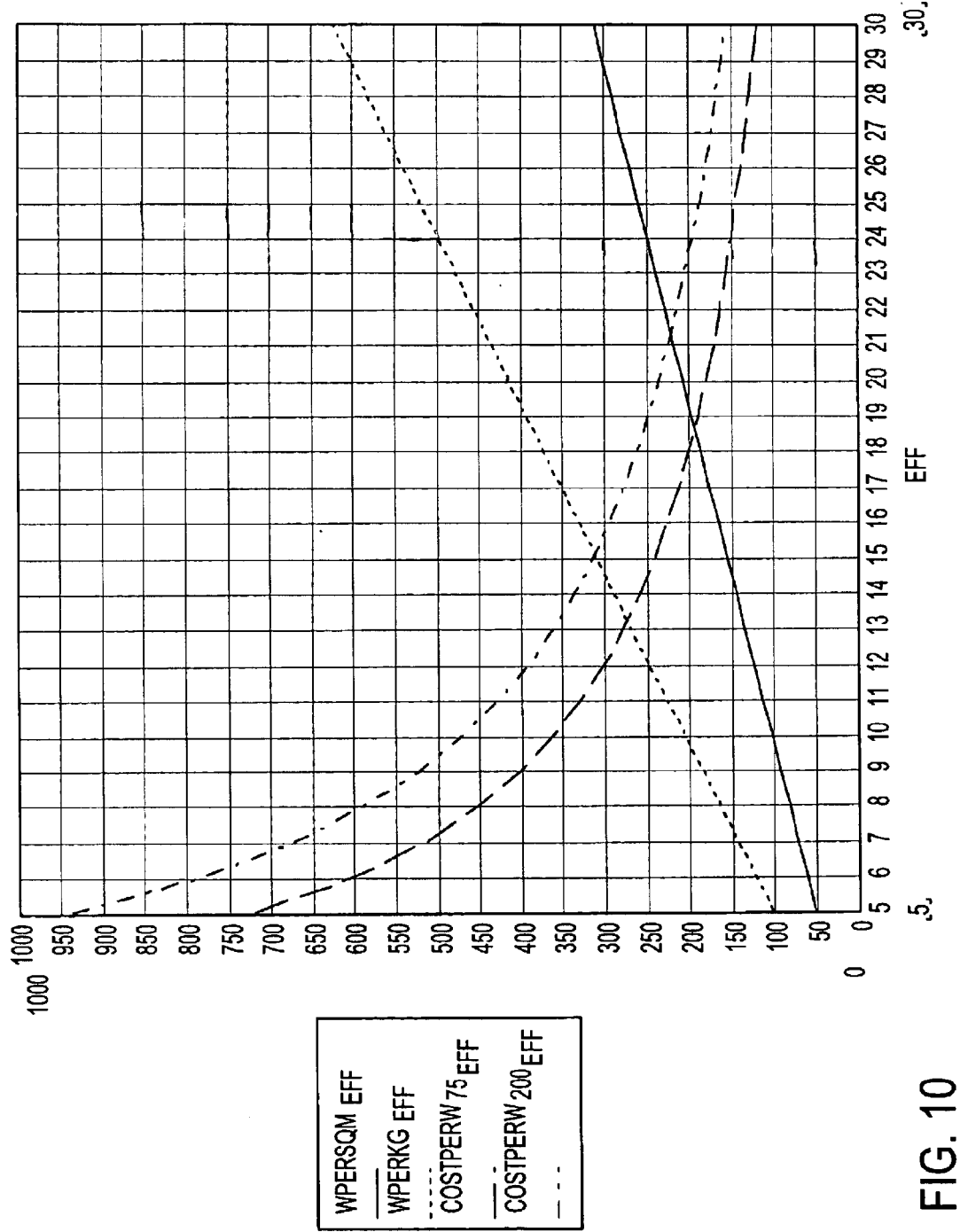
FIG. 10 is a plot of four solar array characteristics versus cell efficiency for an embodiment of the present invention.

FIG. 10 is a plot of four solar array characteristics versus cell efficiency for an embodiment of the present invention. This figure corresponds to an embodiment of the present invention designed to produce 650 Watts at its end of life. The line designated WperSQM$_{Eff}$ depicts the power density (in watts/m2) as a function of cell efficiency. The line designated WperKG$_{Eff}$ depicts the specific power (in watts/kg) as a function of cell efficiency. The line designated CostperW$_{75Eff}$ depicts the average energy cost (in dollars/watt) as a function of cell efficiency given submodules with an average cost of $75/Watt. The line designated CostperW$_{200Eff}$ depicts the average energy cost (in dollars/watt) as a function of cell efficiency given submodules with an average cost of $200/Watt.

Figure 11:
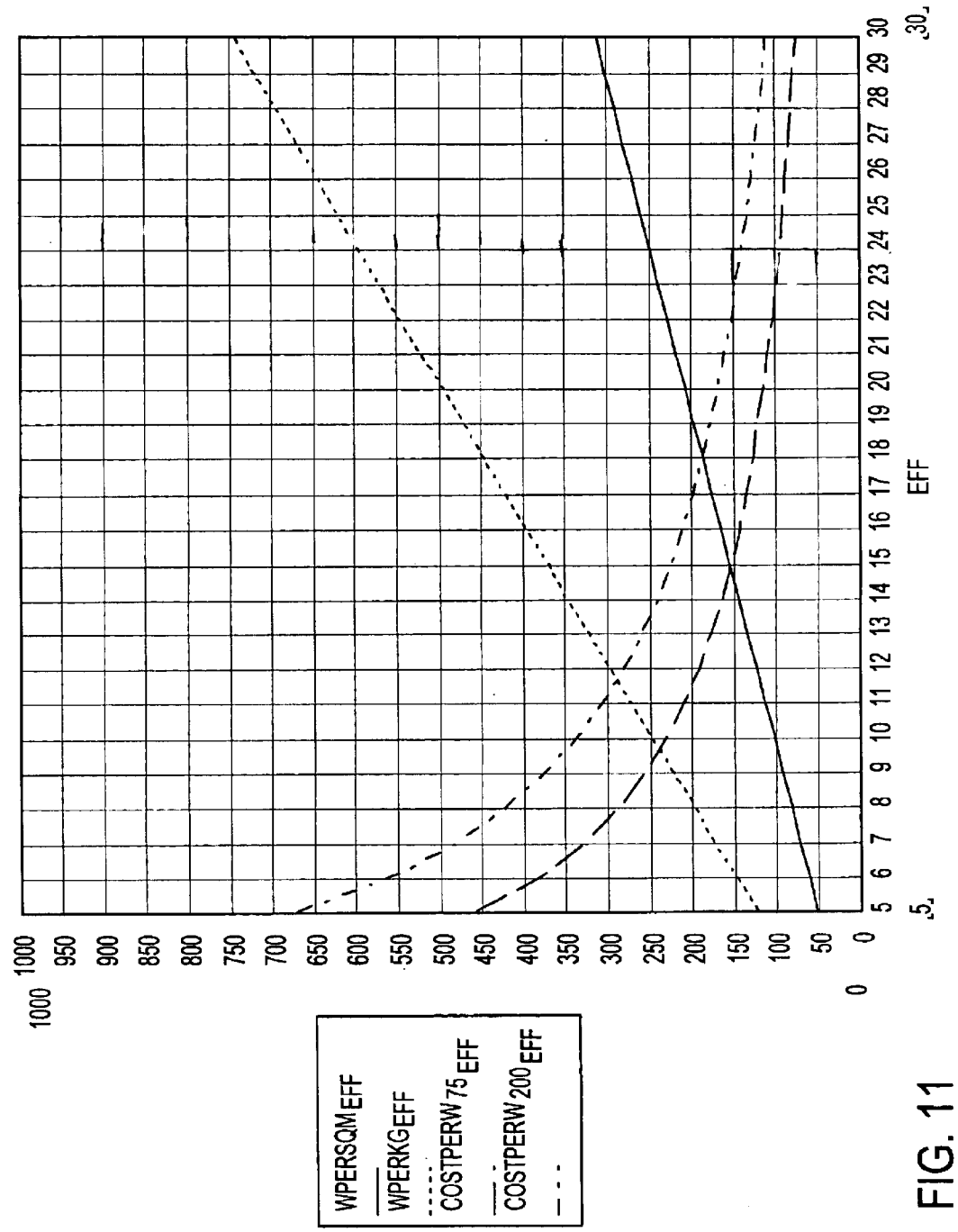
FIG. 11 is a plot of four solar array characteristics versus cell efficiency for another embodiment of the present invention.

FIG. 11 is a plot of four solar array characteristics versus cell efficiency for another embodiment of the present invention. This figure corresponds to an embodiment of the present invention designed to produce 6000 Watts at its end of life. The line designated WperSQM$_{Eff}$ depicts the power density (in watts/m2) as a function of cell efficiency. The line designated WperKG$_{Eff}$ depicts the specific power (in watts/kg) as a function of cell efficiency. The line designated CostperW$_{75Eff}$ depicts the average energy cost (in dollars/watt) as a function of cell efficiency given submodules with an average cost of $75/Watt. The line designated CostperW$_{200Eff}$ depicts the average energy cost (in dollars/watt) as a function of cell efficiency given submodules with an average cost of $200/Watt.

Figure 12:
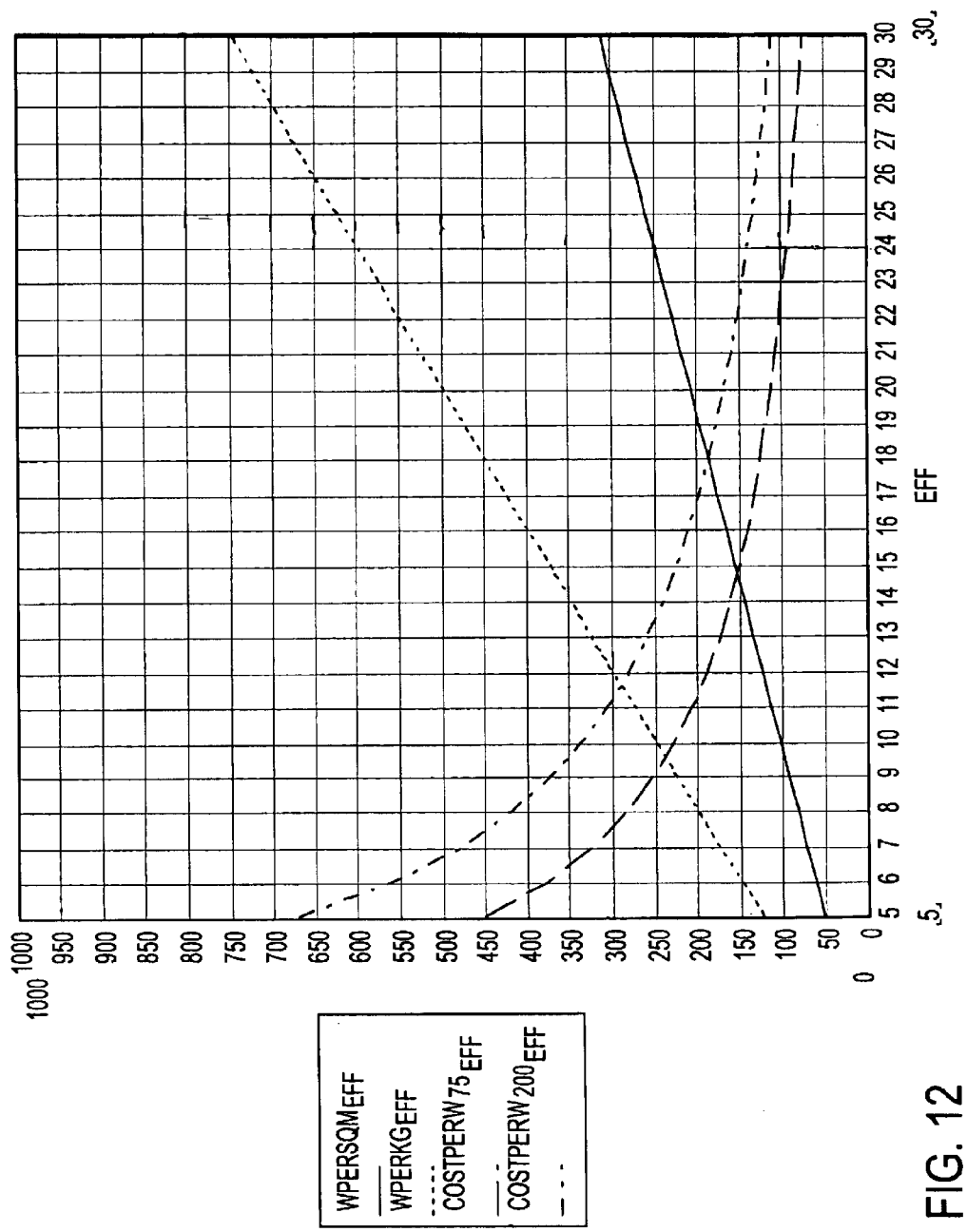
FIG. 12 is a plot of four solar array characteristics versus cell efficiency for a further embodiment of the present invention.

FIG. 12 is a plot of four solar array characteristics versus cell efficiency for a further embodiment of the present invention. This figure corresponds to an embodiment of the present invention designed to produce 15000 Watts at its end of life. The line designated WperSQM$_{Eff}$ depicts the power density (in watts/m2) as a function of cell efficiency. The line designated WperKG$_{Eff}$ depicts the specific power (in watts/kg) as a function of cell efficiency. The line designated CostperW$_{75Eff}$ depicts the average energy cost (in dollars/watt) as a function of cell efficiency given submodules with an average cost of $75/Watt. The line designated CostperW$_{200Eff}$ depicts the average energy cost (in dollars/watt) as a function of cell efficiency given submodules with an average cost of $200/Watt. The high degree of similarity between FIGS. 11 and 12 demonstrates a large degree of predictable scalability in the present invention.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. A method for stiffening or supporting a first device and a second device in a foldable arrays of devices, comprising the steps of:

connecting a hinge along a first shared edge between the first device and the second device;

hingedly connecting a first bracing member to a first side of the first device;

hingedly connecting a second bracing member to the first bracing member along a second shared edge; and hingedly connecting the second bracing member to a first side of the second device such that the second shared edge is parallel with the first shared edge.

2. The method of claim 1, wherein at least one of the devices is selected from the group consisting of an electrochemical device, an electronic device, electro-mechanical device, a bio-electric device, a bio-chemical device, a bio-mechanical device, and a mechanical-chemical device.

3. The method of claim 2, wherein said electrochemical device comprises a thin-film electrochemical device.

4. The method of claim 1, wherein said first device and said second device are adapted to fold to at least an open and a collapsed position.

5. The method of claim 4, wherein said collapsed position comprises a position selected from the group consisting of an inwardly folded position and an outwardly folded position.

6. The method of claim 1, further comprising the step of hingedly connecting an edge stiffener to at least a portion of an edge of one or more of said devices.

7. The method of claim 6, wherein said edge stiffener is adapted to provide deployment force.

8. The method of claim 1, further comprising the step of connecting an edge stiffener between a pair of said devices.

9. The method of claim 6, wherein said edge stiffener is adapted to deploy a pair or more of said devices in an open position.

10. The method of claim 1, wherein said hinge comprises a hinge selected from the group consisting of a conventional hinge, a conventional hinge with integrated torsion spring, a polyimide fold, and a carpenter hinge.

11. The method of claim 1, wherein said hinge is adapted to deploy a pair or more of said devices in an open position.

12. The method of claim 1, wherein said hinge is adapted to provide deployment force to said array.

13. The method of claim 1, wherein one or more of said devices is flexible.

14. The method of claim 1, wherein one or more of said devices is rigid.

15. The method of claim 1, wherein one or more of the devices comprise one or more devices selected from the group consisting of an inactive substrate, a solar energy cell, a direct conversion light antenna, and a radio-frequency identification tag.

16. The method of claim 15, wherein said solar energy cell comprises a thin-film photovoltaic cell.

17. The method of claim 16, wherein said thin-film photovoltaic cell comprises a copper-indium-gallium-selenide cell.

18. The method of claim 1, wherein said foldable array of devices comprises a plurality of devices arranged on a single substrate.

19. The method of claim 18, wherein said substrate is flexible.

20. The method of claim 1, wherein said foldable array comprises a gridded array of devices.

21. The method of claim 1, further comprising the step of connecting a third bracing member to at least one of the first and second devices and to one of the first and second for bracing members, wherein a portion of said third bracing member is adapted to fold.

22. The method of claim 1, further comprising the step of providing an electrostatic discharge layer on at least a portion of said devices and bracing members.

23. The method of claim 1, wherein at least one of the steps of connecting a hinge along a first shared edge between the first device and the second device, hingedly connecting a first bracing member to a first side of the first device, hingedly connecting a second bracing member to a first bracing member, and hingedly connecting the second bracing member to a first side of the second device comprises connecting a living hinge.

24. The method of claim 23, wherein the living hinge comprises means for deploying at least one of the first and second devices without the application of external force.

25. Apparatus for stiffening a first device and a second device in a foldable arrays of devices comprising:

a plurality of devices with at least the first device and the second device connected along a first shared edge with a hinge;

a first bracing member hingedly connected to the first device; and a second bracing member hingedly connected to the first bracing member along a second shared edge and hingedly connected to the second device, wherein the second shared edge is parallel with the first shared edge.

26. The apparatus of claim 25, wherein at least one said devices comprises a device selected from the group consisting of an electrochemical device, an electronic device, an electro-mechanical device, a bio-electric device, a bio-chemical device, a bio-mechanical device, a mechanical-chemical device.

27. The apparatus of claim 26, wherein said electrochemical device comprises a thin-film electrochemical device.

28. The apparatus of claim 25, wherein said first device and said second device are adapted to fold to at least an open and a collapsed position.

29. The apparatus of claim 28, wherein said collapsed position comprises a position selected from the group consisting of an inwardly folded position and an outwardly folded position.

30. The apparatus of claim 25, further comprising an edge stiffener at an edge of one or more of said devices.

31. The apparatus of claim 30, wherein said edge stiffener is adapted to deploy a pair or more of said devices in an open position.

32. The apparatus of claim 25, further comprising an edge stiffener hingedly connected between a pair of said devices.

33. The apparatus of claim 25, wherein said hinge comprises a hinge selected from the group consisting of a conventional hinge, a conventional hinge with integrated torsion spring, a polyimide fold, and a carpenter hinge.

34. The apparatus of claim 25, wherein said hinge is adapted to deploy a pair or more of said devices in an open position.

35. The apparatus of claim 25, wherein said hinge is adapted to provide deployment force to said foldable array.

36. The apparatus of claim 25, wherein one or more of said devices is flexible.

37. The apparatus of claim 25, wherein one or more of said devices is rigid.

38. The apparatus of claim 25, wherein said foldable array plurality of devices comprises one or more devices selected from the group consisting of an inactive substrate, a solar energy cell, a direct conversion light antenna, and a radio frequency identification tag.

39. The apparatus of claim 38, wherein said solar energy cell comprises a thin-film photovoltaic cell.

40. The apparatus of claim 39, wherein said thin-film photovoltaic cell comprises a copper-indium-gallium-selenide photovoltaic cell.

41. The apparatus of claim 25, wherein said foldable array of devices comprises a plurality of devices arranged on a single substrate.

42. The apparatus of claim 41, wherein said substrate is flexible.

43. The apparatus of claim 25, wherein said foldable array comprises a gridded array of devices.

44. The apparatus of claim 25, further comprising a third bracing member hingedly attached to one of the first and second bracing members and to at least one of the first and second devices, wherein said third bracing member comprises at least one foldable portion.

45. The apparatus of claim 25, further comprising an electrostatic discharge layer covering at least a portion of said devices and bracing members.

46. The apparatus of claim 25, including a living hinge configured to hingedly connect at least one of
the first device to the second device,
a first bracing member to the first device,
the second bracing member to the first bracing member, and
the second bracing member to the second device.

47. The apparatus of claim 46, wherein the living hinge is configured to deploy at least one of the first and second devices without the application of external force.

48. A method for integrating passive deployment of a plurality of devices comprising the steps of:
providing a plurality of devices, at least a first device and a second device being foldably connected, along a first shared edge, to one another;
hingedly connected, along a second shared edge, a pair of bracing members; and
hingedly connecting the first and second bracing members to the pair of devices;
and attaching a means for situating a pair of said devices in an open position to a plurality of said devices
wherein the first shared edge and the second shared edge are parallel, and the pair of bracing members is adapted to deploy the first and second devices in an open position.

49. The method of claim 48, wherein the bracing members are selected from the group consisting of an edge stiffener, and a carpenter hinge.

50. An apparatus for integrated passive deployment comprising:
a plurality of devices, at least a pair of the devices being foldably connected to one another along a first shared edge; and
a pair of bracing members, hingedly connected along a second shared edge, and hingedly attached to the pair of devices;
wherein the first shared edge and the second shared edge are parallel, and the pair of bracing members is adapted to deploy the pair of said devices in an open position attached to a plurality of said devices.

51. The apparatus of claim 50, wherein said bracing members are selected from the group consisting of an edge stiffener, and a carpenter hinge.

52. A method for integrating cabling with stiffening or supporting means comprising the steps of:
providing a plurality of devices, at least a pair of devices being foldably attached to one another; and
attaching at least two hingedly connected bracing members to the pair of said foldably attached devices;
wherein at least one of the bracing members used in the attaching step comprises means for transmitting electricity.

53. The method of claim 52, wherein two or more of the bracing members comprises means for transmitting electricity.

54. The method of claim 52, wherein said means for transmitting electricity comprises means for transmitting electrical energy to or from a power source.

55. The method of claim 52, wherein said means for transmitting electricity comprises means for communicating an electric signal.

56. The method of claim 52, wherein said means for transmitting electricity comprises flexible circuit technology.

57. The method of claim 52, wherein said means for transmitting electricity further comprises one or more electronic circuits selected from the group consisting of a filter circuit, a boost circuit, a transformer circuit, an amplifier circuit, and an automatic bypass circuit.

58. An apparatus for stiffening or supporting means with integrated cabling comprising:
a plurality of devices, at least a pair of the devices being foldably attached to one another; and
at least two bracing members attached to the pair of foldably attached devices;
wherein at least one of the bracing members comprises means for transmitting electricity.

59. The apparatus of claim 58, wherein two or more of the bracing members comprises means for transmitting electricity.

60. The apparatus of claim 58, wherein said means for transmitting electricity comprises means for transmitting electrical energy to or from a power source.

61. The apparatus of claim 58, wherein said means for transmitting electricity comprises means for communicating an electric signal.

62. The apparatus of claim 58, wherein said means for transmitting electricity comprises flexible circuit technology.

63. The apparatus of claim 58, further comprising one or more electronic circuits selected from the group consisting of a filter circuit, a boost circuit, a transformer circuit, an amplifier circuit, and an automatic bypass circuit.

64. A method for manufacturing a deployable array of devices comprising the steps of:
providing a plurality of devices, at least a pair of devices being foldably attached to one another along a first shared edge;
hingedly attaching at least a pair of bracing members, connected along a second shared edge, to the pair of devices, such that the first and second shared edges are parallel; and
collapsing the plurality of devices and the pair of bracing members.

65. The method of claim 64, wherein said step of collapsing comprises at least one step of folding.

66. The method of claim 65, further comprising at least one step of rolling after said at least one step of folding.

67. An apparatus for use as a deployable array of devices comprising:
a plurality of devices, at least a pair of the devices being foldably attached to one another along a first shared edge; and
at least a pair of bracing members, hingedly connected to each other along a second shared edge parallel with the first shared edge, and
hingedly connected to the pair of devices;
wherein the plurality of devices and the pair of bracing members are collapsed.

68. The apparatus of claim 67, wherein the plurality of devices and the pair of bracing members is collapsed using a collapsing technique employing at least one step of folding.

69. The apparatus of claim 68, wherein said collapsing technique further comprises at least one step of rolling.

* * * * *